United States Patent [19]

Graves

[11] 4,390,105
[45] Jun. 28, 1983

[54] ELECTRICAL OUTLET BOX

[75] Inventor: Howard K. Graves, Berlin, Ohio

[73] Assignee: Valen Mfg. Co., Cleveland, Ohio

[21] Appl. No.: 289,059

[22] Filed: Jul. 31, 1981

[51] Int. Cl.$^3$ .............................................. H02G 3/08
[52] U.S. Cl. ............................... 220/3.6; 248/DIG. 6
[58] Field of Search .................. 220/3.2, 3.3, 3.4, 3.5, 220/3.6, 3.9; 248/27.1, DIG. 6

[56] References Cited

U.S. PATENT DOCUMENTS

| | | | |
|---|---|---|---|
| 1,779,681 | 10/1930 | Smith et al. ........................... | 220/3.6 |
| 4,120,416 | 10/1978 | Suk ....................................... | 220/3.4 |
| 4,215,787 | 8/1980 | Moran, Jr. et al. ................... | 220/3.6 |

*Primary Examiner*—Steven M. Pollard
*Assistant Examiner*—D. Voorhees
*Attorney, Agent, or Firm*—Yount & Tarolli

[57] ABSTRACT

An electrical outlet box having improved mounting means for enabling the box to be mounted in an opening of a wall with the open front of the box being essentially flush with the front face of the wall. The mounting means includes a pair of mounting elements extending outwardly from the open front of the box for engaging the front face of the wall together with a U-shaped resilient clamping member which is mounted exteriorly of the box so as to span the box with a connecting or base portion and two depending legs which extend therefrom toward the open front of the box with the legs adapted to engage the rear face of the wall surrounding the opening therein. A connection device, such as a screw, interconnects the floor of the box with the leg connecting portion of the clamp and it serves to vary the distance between the floor of the box and the connecting portion of the clamp to cause the leg portions to move toward the front thereof and engage the rear side of the wall. The legs are provided with camming means which extend toward the side walls of the box which are provided with cooperating slots for receiving the camming means and which provides a camming action as the clamp is pulled inwardly toward the box so that the legs will cam outwardly of the box to engage the backside of the wall.

6 Claims, 6 Drawing Figures

ELECTRICAL OUTLET BOX

BACKGROUND OF THE INVENTION

This invention relates to the art of electrical outlet boxes and, more particularly, to improvements in enabling an electrical outlet box to be mounted in openings of walls of various thicknesses and with the open front of the box being essentially flush with the front face of the wall as is frequently required by building and electrical codes.

Although the invention will be described in conjunction with a preferred embodiment of an electrical outlet box having a resilient metal clamp associated therewith, it is to be appreciated that other materials may conceivably be used.

Electrical outlet boxes are mounted in position in a wall having an opening therein and various devices have been provided for securing the electrical box to the wall. Frequently the box must be installed in an existing wall having an opening therein so that the box may be inserted into the wall to the desired position. When so located it is necessary to render a clamping or holding mechanism operative to maintain the box in position and such holding means must be capable of being operated from the front of the box when positioned in the wall opening.

There have been various proposals made for securing devices attached to such electrical boxes whereby a box may be inserted into an existing opening and then the securing device may be operated from the front of the box to clamp the box to the wall structure. However, these are typically awkward devices and frequently either the securing device or the electrical outlet box must be destroyed in order to remove the outlet box once having been clamped into position. Moreover, these securing devices are frequently bulky and awkward and frequently require that the opening be enlarged beyond that needed to service only the box in order to accommodate the securing device.

SUMMARY OF THE INVENTION

It is an object of the present invention to provide an electrical outlet box having clamping or securing means associated therewith which permits the box to be inserted into an opening of an existing wall without requiring that the opening be substantially enlarged beyond that necessary to receive the box alone.

It is a still further object of the present invention to provide such an outlet box having securing or fastening means associated therewith so that after the box has been clamped into position it may be removed from the structure without the cumbersome operations frequently encountered in the past resulting in destruction of the box or fastening means and perhaps of the wall structure as well.

It is a still further object of the present invention to provide a securing device for such an outlet box which may be easily inserted along with the box into an existing opening without requiring enlargement of the opening beyond that normally required for the box itself.

In accordance with the invention, the electrical outlet box has an open front with outwardly extending mounting flanges for engaging the front face of a supporting wall when the box is received in an opening therein so that the front face is essentially flush with the front surface of the wall. An essentially U-shaped clamping member is mounted exteriorly of the box in a manner so as to span it with the interconnecting base portion of the U-shaped member and having legs extending therefrom on opposite sides of the box toward the front face thereof. A connecting device, such as a screw, connects the bottom of the box with the base portion of the clamping member and may be operated so as to pull the clamping member toward the back of the box. Each leg is provided with a cam lug which extends into a slot provided in one of the side walls of the box so that as the clamping member is pulled toward the back of the box the legs will cam outwardly to engage the rear side of the wall to which the box is being secured.

DESCRIPTION OF THE DRAWINGS

The foregoing and other objects and advantages of the present invention will become more readily apparent from the following description of the preferred embodiment thereof as taken in conjunction with the accompanying drawings, wherein.

DESCRIPTION OF PREFERRED EMBODIMENT

Figure 3:
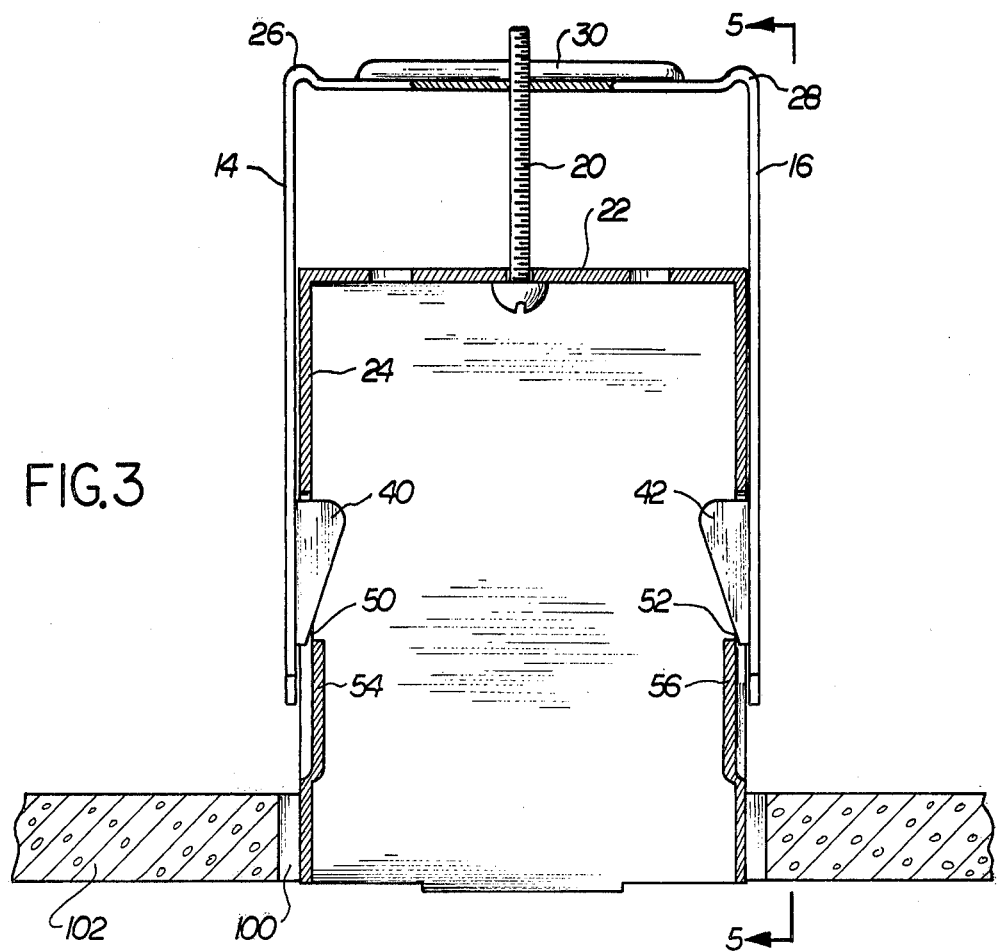
FIG. 3 is a view illustrating the clamp mounted to an electrical outlet box which has been inserted into a wall having an opening for receiving same.
Figure 4:
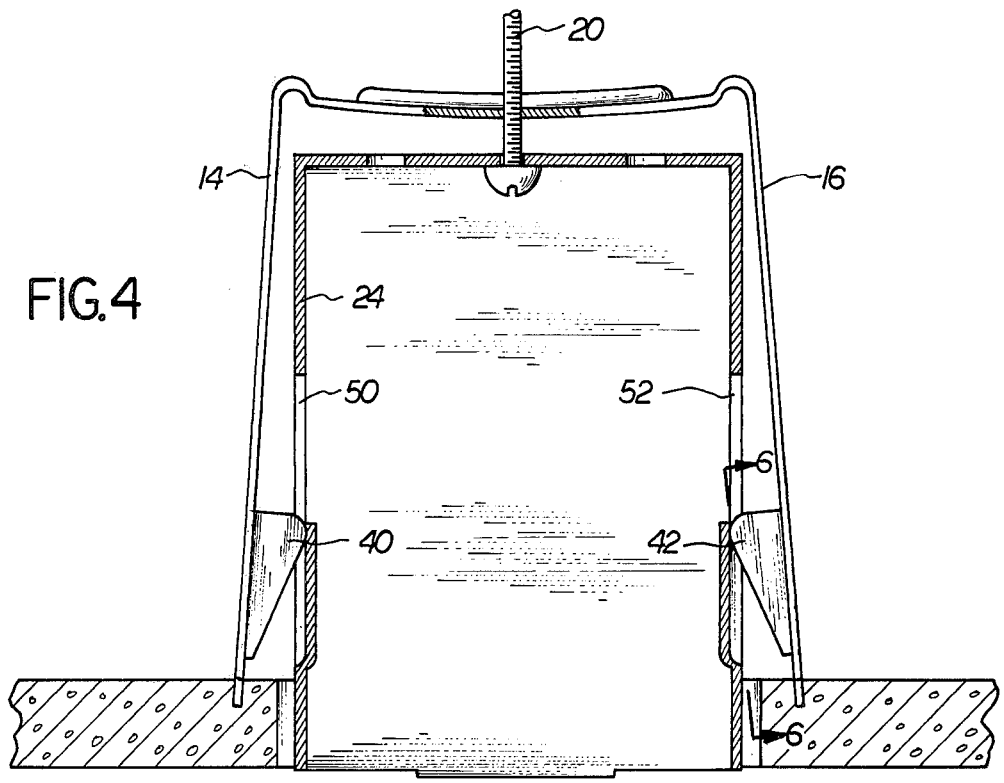
FIG. 4 is a view similar to that of FIG. 3 but showing the clamping member being drawn toward the electrical box so that the legs extending therefrom make engagement with the wall to which the box is to be secured.
Figure 6:
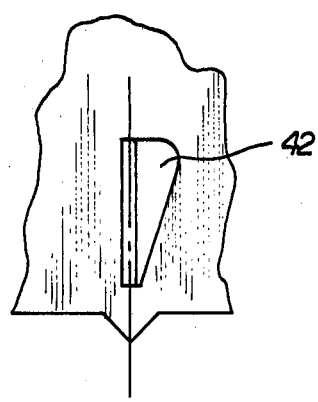
FIG. 6 is a view taken generally along line 6—6 and looking in the direction of the arrows.
Figure 5:
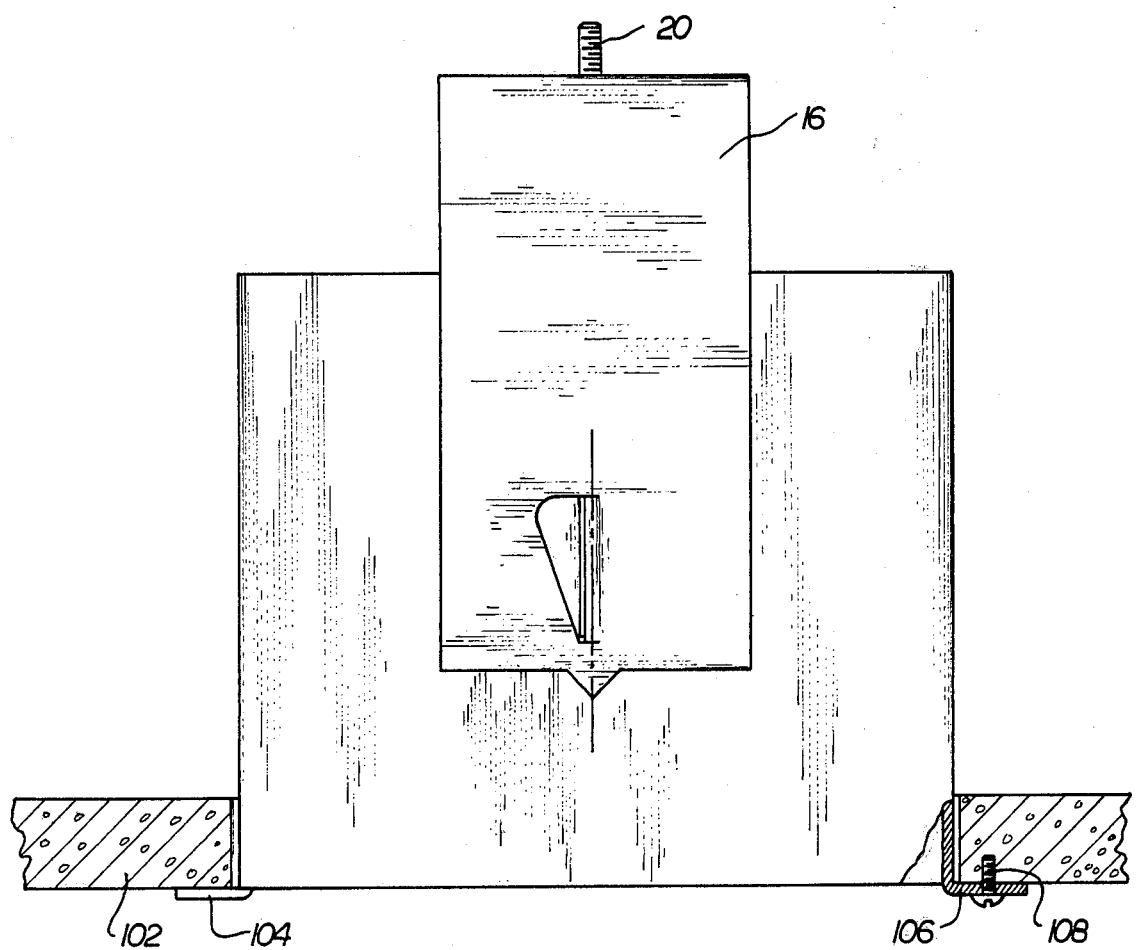
FIG. 5 is a view taken essentially along line 5—5 of FIG. 3.

Reference is now made to the drawings wherein the showings are for purposes of illustrating a preferred embodiment of the invention only and not for purposes of limiting same. The clamping member takes the form of a generally U-shaped resilient metal clamp 10 having a base portion 12 which interconnects two depending leg portions 14 and 16. Although other material might be used, it is preferably constructed of No. 20 gauge (0.036") 1010 cold rolled steel. The base portion 12 is provided with a threaded aperture 18 for receiving a connecting device in the form of a screw 20 (see FIG. 3) which serves to connect the floor 22 of the electrical outlet box 24 with the clamp. In constructing clamp 10, a reverse bend 26 and 28 is provided between the base 12 and its respective legs 14 and 16. This reverse bend is best illustrated in FIGS. 3 and 4 has a radius which is greater than that of the thickness of the material employed. The reverse bend distributes stresses as the legs are bowed outwardly during operation and, hence helps prevent the material from exceeding its elastic limit. A straight right angle bend might more easily exceed the elastic limit during operation. Upwardly extending ribs 30 and 32 are provided in base portion 12 so as to straddle aperture 18 and extend essentially between reverse bends 26 and 28 (as best seen in FIGS. 3 and 4). These ribs provide a strengthening effect to prevent overbowing during the clamping operation, as is best seen in FIG. 4, when the base portion is pulled toward the floor 22 of the box.

Legs 14 and 16 are provided with inwardly extending cam lugs 40 and 42, respectively. These are in alignment and fall within a plane which includes the cam lugs, aperture 18 as well as the apexes of pointed ends 44 and 46, respectively, of legs 14 and 16. Each of the cam lugs 40 or 42 is formed by punching and folding so that the cam lug extends inwardly toward the side walls of the electrical outlet box.

Figure 1:
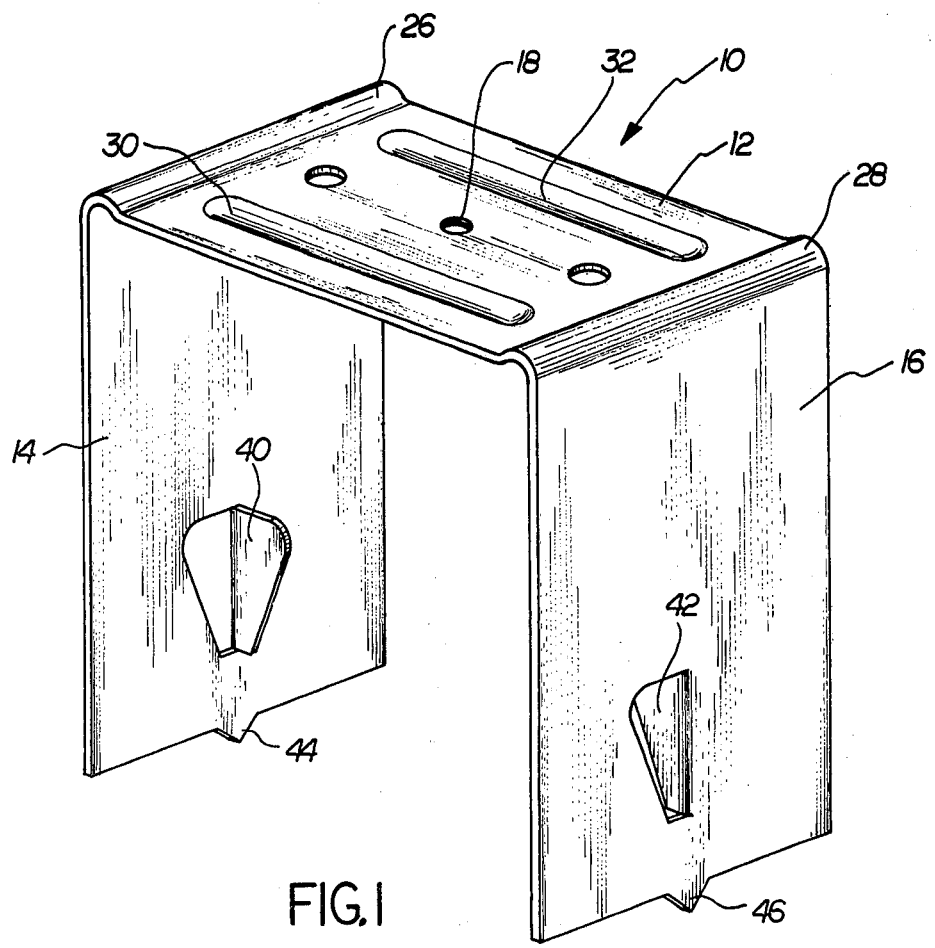
FIG. 1 is a perspective view illustrating the U-shaped clamp in accordance with the present invention.
Figure 2:
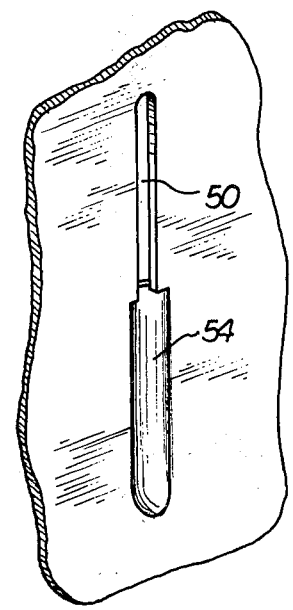
FIG. 2 is a fragmentary view of a portion of an electrical outlet box constructed in accordance with the invention to provide a slot for receiving a cam lug provided by the clamp.

The electrical outlet box 24 is provided with elongated slots 50 and 52 for respectively receiving cam lugs 40 and 42 when clamp 12 is in its relaxed condition, as shown in FIG. 3. In alignment with slots 50 and 52 there is provided recessed channels 54 and 56 which provide guided camming channels for the cam lugs 40 and 42. FIG. 2 provides an enlarged illustration of slot 50 and its associated camming channel 54. Each of the cam lugs has a camming angle on the order of 25.

The outlet box 24 with clamp 12 secured thereto by means of a screw 22 in its relaxed condition, as shown in FIG. 3, may be inserted into an opening 100 in a support wall 102. Typically, such a support wall may be plasterboard or the like. With the clamp in its relaxed condition as shown in FIG. 3 there is no need for providing an enlarged opening since legs 14 and 16 fit snuggly against the exterior of the box with cam legs 40 and 42 extending through the slots 50 and 52, respectively. Once the box is fitted into the opening a pair of stops 104 and 106 extending outwardly from the open front face of the box will engage the front surface of wall 102 so that the opening of the box is essentially flush with the front surface. The stops are provided with suitable apertures so that screws and the like, such as screw 108 may be inserted into the wall 102.

With the box in place, it may now be secured to the wall by turning screw 20 to cause clamp 10 to be pulled toward the floor 22 of the box. As the clamp is being pulled toward the box the cam lugs 40 and 42 will ride up on the camming channels 54 and 56 to cause the legs to bow outwardly from the box until the pointed ends 44 and 46 engage and to some extent penetrate the rear surface of wall 102 (as is shown in FIG. 4). During this operation the legs 14 and 16 will pivot about the reverse bends 26 and 28, respectively. During this process, the base portion 12 will bow inwardly toward the box 24 as shown in FIG. 4. Ribs 30 and 32 serve to strengthen base portion 12 so as to resist this bowing action. Because of the resiliency of the clamp there will be a tendency upon loosening screw 20 for the legs to return to the relaxed position of FIG. 3 so that the box together with the clamp may be removed from the wall opening.

It will be noted that screw 20, cam legs 40 and 42 and pointed ends 44 and 46 all fall within a common plane so as to minimize any torsional effects which would take place when operating the screw to pull the clamp toward the box during the clamping operation.

Whereas the invention has been described in conjunction with a preferred embodiment, it is to be appreciated that various modifications may be made without departing from the spirit and scope of the invention as defined by the appended claims.

What is claimed is:

1. An electric outlet box for mounting in a wall opening and having first mounting means adapted to abut against a front face of a support wall through an opening of which the box is adapted to extend, second mounting means adjustably secured to the exterior of said box, said second mounting means including an essentially U-shaped member having a base portion and first and second leg portions extending therefrom in the direction of the box opening, connecting means for adjustably connecting said box with said base member for varying the distance therebetween, said first and second leg members having first and second camming means extending therefrom toward the exterior side walls of said box, said box having slots for receiving said first and second camming members when said clamp is in a first position spaced from said box and camming surfaces for said camming means as said connecting means is operated to decrease the distance between said clamp means and said box to cause said legs to bow outwardly from said box so that the ends thereof may engage the rear face of said supporting wall so as to secure said box thereto.

2. An electrical outlet box as set forth in claim 1 wherein each said camming means has a canted camming surface.

3. An electrical outlet box as set forth in claim 1 wherein said base member has rib formations therein for structural strengthening.

4. An electrical outlet box as set forth in claim 1 wherein said clamping means is provided with a reverse bend intermediate said base portion and each of said leg portions.

5. An electrical outlet box as set forth in claim 1 wherein each said leg is provided with a pointed end for engaging the rear face of a said supporting wall.

6. An electrical outlet box as set forth in claim 1 wherein said camming surfaces on said outlet box include a camming channel associated with each said cam receiving slot with the camming channel providing an aligned cam guide for its associated camming means.

* * * * *